G. L. HINDERER.
FENDER.
APPLICATION FILED MAY 17, 1912.

1,089,468.

Patented Mar. 10, 1914.

Witnesses
M. H. LoRee
Chas E Doyle

Inventor
Gustave L. Hinderer
By W. W. Williamson
Attorney

UNITED STATES PATENT OFFICE.

GUSTAVE L. HINDERER, OF PHILADELPHIA, PENNSYLVANIA.

FENDER.

1,089,468.  Specification of Letters Patent.  Patented Mar. 10, 1914.

Application filed May 17, 1912. Serial No. 697,859.

*To all whom it may concern:*

Be it known that I, GUSTAVE L. HINDERER, a citizen of the United States, residing at Philadelphia, in the county of Philadelphia and State of Pennsylvania, have invented new and useful Improvements in Fenders, of which the following is a specification.

My invention relates to new and useful improvements in fenders and has for its object to provide a device of this character which may be used upon different kinds of vehicles, such as trolley cars and automobiles.

A further object of the invention is to provide a fender which may be raised up against the front of the vehicle so that less space will be occupied and one which may be readily and quickly lowered should any person or object get in the path of the moving vehicle, thus picking up said person or object and preventing loss of life and often injury.

A further object of the invention is to provide a fender of this character which may be either raised or lowered by the operator of the vehicle without moving from the position maintained while operating the vehicle.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numeral to the accompanying drawing forming a part of this specification, in which—

Figure 1:
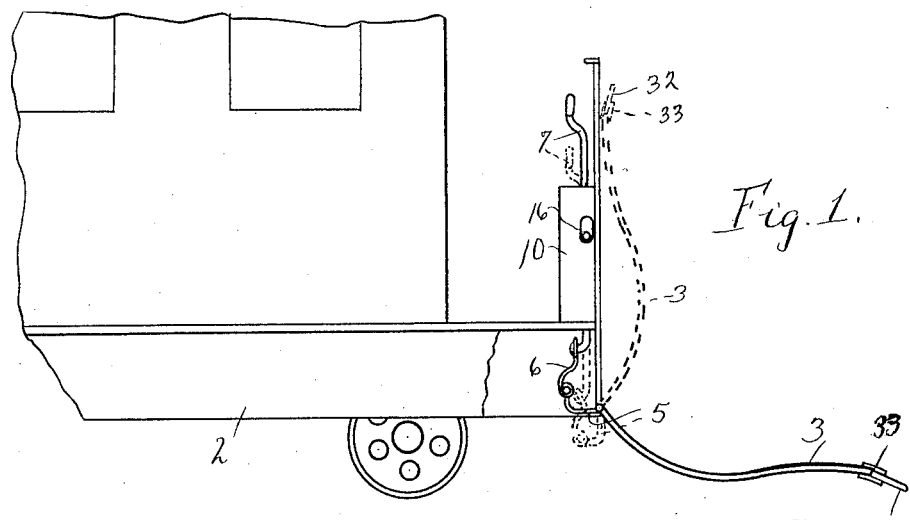
Figure 2:
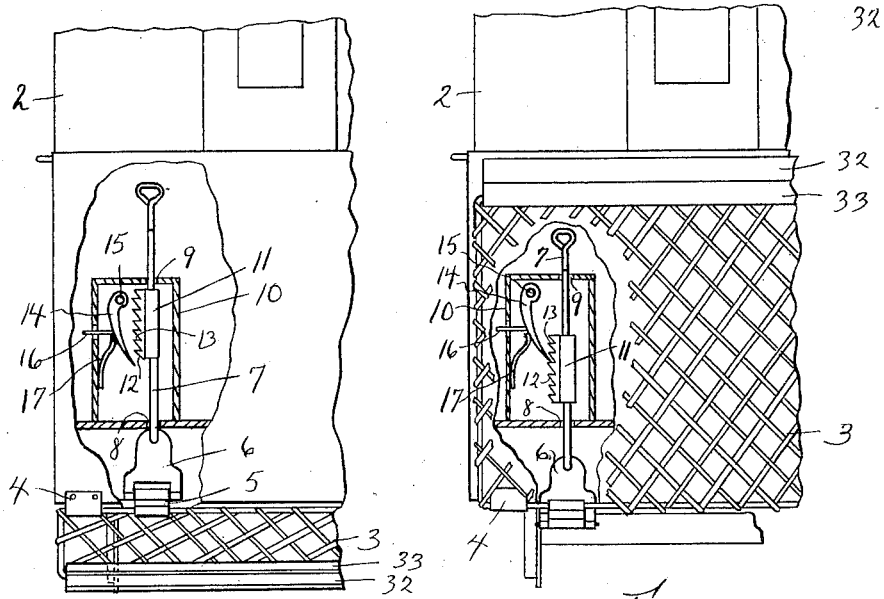

Figure 1, is a side elevation of my improved fender showing it applied to a car, showing the fender raised in dotted lines. Fig 2, is a front elevation thereof, parts being broken away to clearly illustrate the construction, the fender being lowered and Fig. 3, is a similar view showing the fender raised.

Figure 3:
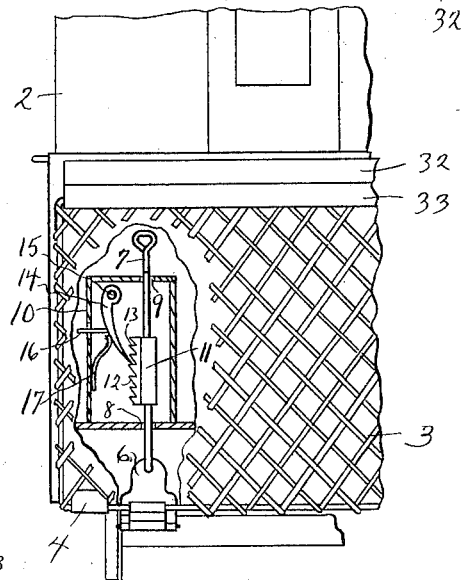

In carrying out my invention as here embodied, 2 represents a vehicle, the same being a trolley car used for illustration in Fig. 1 to Fig. 3, inclusive.

To the front of the vehicle is attached the fender 3, as by hinges 4. To the fender is permanently attached the rearwardly extending L shaped arm 5, to the inner end of which is pivoted the connecting link 6. said connecting link being fastened to the lower end of the vertical operating rod 7, which passes upward through an opening 8 in the platform of the car and through a second opening 9 in the top of the inclosing casing 10 which is mounted upon the car.

Upon the operating rod 7 within the casing 10 is mounted the toothed member 11, the teeth thereof having an angular under face 12 and a horizontal upper face 13, which are engaged by the end of the pawl 14 pivoted at 15 as to the casing 10, said pawl carrying an operating finger 16 which is raised to disengage the pawl 14 from the toothed member 11. The end of the pawl 14 is normally held in contact with the teeth of the member 11 by a spring 17.

From this description it will be seen that by forcing the operating rod 7 downward the L shaped arm will be caused to move in the same direction through the medium of the connecting link 6, said connecting link being loosely attached to the L shaped arm, and the operating rod, to permit the parts to take their different position without combining. This operation will cause the fender to be raised as shown in dotted lines in Fig. 1, and it will be held in this position by the engagement of the pawl with the toothed member 11, as shown in Fig. 3. When it is desired to lower the fender, the pawl 14 is disengaged from the toothed member 11 by raising the outer end of the finger 16 against the action of the spring 17, at which time, the weight of the fender will cause it to fall to the position shown in Fig. 1. This is done when a person or object enters the path of the moving vehicle and when said person or object is struck by the fender they will be hit at a point so close to the ground that they will be knocked over and caused to fall into the fender, thus saving them from being run over by the vehicle.

Of course I do not wish to be limited to the exact details of construction as here shown, as these may be varied within the limits of the appended claims without departing from the spirit of my invention.

Having thus fully described my invention, what I claim as new and useful, is—

1. In combination with a car, a fender hinged thereto, said fender carrying a flexible strip along its front edge, a rearwardly projecting L shaped arm carried by the fender, a casing mounted upon the car, an operating rod passing through said casing and the floor of the car, means for connecting said operating rod with the L shaped arm, a toothed member mounted upon the operating rod within the casing, a pawl normally held in engagement with the teeth of said member to hold the fender in any desired position and means for disengaging the pawl from the toothed member.

2. In combination with a car, a fender hinged thereto, an L shaped arm carried by said fender, a casing mounted upon the platform of the car, an operating rod passing through said casing and the floor of the car, a connecting link attached to said operating rod and to the L shaped arm, a toothed member mounted upon the operating rod and lying within the casing, a pawl normally engaging the teeth of the toothed member for holding the fender in any desired elevated position, and an operating finger carried by the pawl and passing through the casing, whereby the pawl may be disengaged from the toothed member to permit the fender to drop.

In testimony whereof, I have hereunto affixed my signature in the presence of two subscribing witnesses.

GUSTAVE L. HINDERER.

Witnesses:
H. MULLSCHLEGEL,
MAX BOHNACKOLP.

Copies of this patent may be obtained for five cents each, by addressing the "Commissioner of Patents, Washington, D. C."